United States Patent
Baldwin et al.

(10) Patent No.: US 9,471,561 B2
(45) Date of Patent: Oct. 18, 2016

(54) ADAPTIVE PARSER-CENTRIC TEXT NORMALIZATION

(71) Applicant: INTERNATIONAL BUSINESS MACHINES CORPORATION, Armonk, NY (US)

(72) Inventors: Tyler S. Baldwin, San Jose, CA (US); Ching-Tien (Howard) Ho, San Jose, CA (US); Benny Kimelfeld, Cupertino, CA (US); Yunyao Li, San Jose, CA (US); Congle Zhang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 14/141,036

(22) Filed: Dec. 26, 2013

(65) Prior Publication Data

US 2015/0186355 A1    Jul. 2, 2015

(51) Int. Cl.
*G06F 17/27* (2006.01)
*G06F 17/30* (2006.01)

(52) U.S. Cl.
CPC ....... *G06F 17/273* (2013.01); *G06F 17/30011* (2013.01); *G06F 17/30958* (2013.01)

(58) Field of Classification Search
CPC .... G06F 17/28; G06F 17/2705; G06F 17/21; G06F 17/30958; G06F 17/30011; G10L 13/08
See application file for complete search history.

(56) References Cited

U.S. PATENT DOCUMENTS

| | | | | |
|---|---|---|---|---|
| 5,970,449 A * | 10/1999 | Alleva | ................. | G06F 17/271 704/235 |
| 6,112,168 A * | 8/2000 | Corston | ................. | G06F 17/274 704/9 |
| 6,411,974 B1 | 6/2002 | Graham | | |
| 7,809,548 B2 * | 10/2010 | Mihalcea | ............. | G06F 17/277 704/1 |
| 8,355,919 B2 | 1/2013 | Silverman | | |
| 8,977,649 B1 * | 3/2015 | Hassidim | .......... | G06F 17/30958 705/319 |
| 2005/0138556 A1 * | 6/2005 | Brun | ................. | G06F 17/30719 715/264 |
| 2009/0281791 A1 * | 11/2009 | Li | ........................ | G06F 17/277 704/9 |

(Continued)

OTHER PUBLICATIONS

Bao et al. "A Graph Approach to Spelling Correction in Domain-Centric Search", Proceedings of the 49th Annual Meeting of the Association for Computational Linguistics, pp. 905-914, Portland, Oregon, Jun. 19-24, 2011.*

(Continued)

*Primary Examiner* — Jialong He (74) *Attorney, Agent, or Firm* — Erik Huestis; Stephen Kenny; Foley Hoag LLP (57) ABSTRACT

Embodiments of the present invention relate to a customizable text normalization framework providing for domain adaptability through modular replacement generators. In one embodiment, a method of and computer program product for text normalization are provided. An input sequence comprising a plurality of tokens is received. A plurality of generators is applied to the input sequence to generate a set of candidate replacements of the tokens of the sequence. A plurality of subsets of the set of candidate replacements is determined such that the candidate replacements of each subset are syntactically consistent. A probability is determined for each of the subsets. A subset of the plurality of subsets having the highest probability is selected. Each candidate replacement of the selected subset is applied to the input sequence to generate an output sequence. The output sequence is outputted.

20 Claims, 4 Drawing Sheets

| | Generator | from | To |
|---|---|---|---|
| 101 | keep original | good | good |
| 102 | edit distance | bac | back |
| 103 | lowercase | NEED | need |
| 104 | capitalize | it | It |
| 105 | spelling | disspaear | disappear |
| 106 | contraction | wouldn't | would not |
| 107 | slang language | ima | I am going to |
| 108 | Insert punctuation | ε | . |
| 109 | Duplicated punctuation | !? | ! |
| 110 | Delete filler | lmao | ε |

(56) References Cited

U.S. PATENT DOCUMENTS

2012/0303355 A1* 11/2012 Liu .................... G06F 17/2217
    704/9
2013/0096911 A1* 4/2013 Beaufort ............... G06F 17/273
    704/9

OTHER PUBLICATIONS

Hassan et al. "Social Text Normalization using Contextual Graph Random Walks", Proceedings of the 51st Annual Meeting of the Association for Computational Linguistics, pp. 1577-1586, Sofia, Bulgaria, Aug. 4-9, 2013.*

Liu et al. "Insertion, Deletion, or Substitution? Normalizing Text Messages without Pre-categorization nor Supervision", Proceedings of the 49th Annual Meeting of the Association for Computational Linguistics:shortpapers, pp. 71-76, Portland, Oregon, Jun. 19-24, 2011.*

Tarhio, J. "Context Coding of Parse Trees." Department of Computer Science, University of Helsinki, Finland, p. 1, Published in 1995.

Aubin, S., Nazarenko, A., Nédellec, C. "Adapting a general parser to a sublanguage." France, p. 1-5, Published in 2006.

Baldwin, T., Ho, H., Kimelfeld, B., Li, Y., Zhang, C."Adaptive Parser-Centric Text Normalization." IBM, Almaden Research Center, San Jose, CA, p. 1-9, Published on Aug. 4, 2013.

* cited by examiner

|     | Generator | from | To |
| --- | --- | --- | --- |
| 101 | keep original | good | good |
| 102 | edit distance | bac | back |
| 103 | lowercase | NEED | need |
| 104 | capitalize | it | It |
| 105 | spelling | disspaear | disappear |
| 106 | contraction | wouldn't | would not |
| 107 | slang language | ima | I am going to |
| 108 | Insert punctuation | ε | . |
| 109 | Duplicated punctuation | !? | ! |
| 110 | Delete filler | lmao | ε |

| test<br>I Kinda wanna get tablet NEW | gold<br>I Kind of want to get a new tablet | svo |
|---|---|---|
| verb(get) | verb(want)<br>verb(get) | precision$_v$ =1/1<br>recall$_v$ =1/2 |
| Subj(get,I)<br>Subj(get,wanna)<br>obj(get,NEW) | Subj(want,I)<br>Subj(get,I)<br>obj(get,iPad) | precision$_{so}$ =1/3<br>recall$_{so}$ =1/3 |

ADAPTIVE PARSER-CENTRIC TEXT NORMALIZATION

BACKGROUND

Embodiments of the present invention relate to text normalization, and more specifically, to a customizable text normalization framework providing for domain adaptability through modular replacement generators.

BRIEF SUMMARY

According to one embodiment of the present invention, a method of and computer program product for text normalization are provided. An input sequence comprising a plurality of tokens is received. A plurality of generators is applied to the input sequence to generate a set of candidate replacements of the tokens of the sequence. A plurality of subsets of the set of candidate replacements is determined such that the candidate replacements of each subset are syntactically consistent. A probability is determined for each of the subsets. A subset of the plurality of subsets having the highest probability is selected. Each candidate replacement of the selected subset is applied to the input sequence to generate an output sequence. The output sequence is outputted.

DETAILED DESCRIPTION

Text normalization is the process of transforming informal or malformed writing into a standard form. For example, transforming transcribed slang into standard English poses a text normalization problem. Text normalization may provide a preprocessing step in text-to-speech, speech recognition, named entity recognition, information extraction, parsing, and machine translation. In general, text normalization may be applied in computing tasks that involve natural language in order to provide a standardized input form.

Text normalization may include mapping all out-of-vocabulary non-standard word tokens to their in-vocabulary standard forms. However, the generalized text normalization task has a broader scope, encompassing the conversion of input text to a grammatically correct phrase in addition to replacement of non-standard tokens. Correction of grammar may include modifying punctuation and capitalization as well as adding, removing and reordering words.

Styles of informal text may vary between domains. For example, the style of writing appearing on Twitter is distinct from the style of text drawn from a transcript of a spoken conversation. An SMS message has its own stylistic conventions, which are in turn distinct from those of Twitter. A text normalization approach may be tailored to a particular domain, and trained using data from that domain. However, while tailoring to a particular domain may increase performance within that domain, it may also reduce the adaptability of the approach to other domains.

Accordingly, the present disclosure provides a customizable text normalization framework. The framework provides for domain adaptability through modular replacement generators, which produce fully grammatical sentences. The introduction of a small set of domain-specific generators allows the framework to outperform other approaches, including word-to-word normalization. The flexibility of the model also allows it to produce fully grammatical sentences, which is beyond the capability of a word-to-word normalization approach.

The framework of the present disclosure builds a statistical model over a series of heuristic replacement generators. By doing so, it allows a designer to quickly adapt a generic model to a new domain with the inclusion of a small set of domain-specific generators.

As noted above, text normalization may be applied to provide clean text for downstream processing applications, such as syntactic parsing. Thus, there is a need for evaluation metrics that capture the effect of text normalization on these downstream processing applications. Evaluating text normalization in terms of word error rate or BLEU (Bilingual Evaluation Understudy) score may not provide an accurate evaluation of performance on a parsing task, where a well-placed punctuation mark may provide more substantial improvements than changing a non-standard word form.

Accordingly, an evaluation metric is provided that ties normalization performance directly to the performance of a downstream dependency parser. This evaluation metric allows for a deeper understanding of how certain normalization actions affect the output of the parser.

In some embodiments, the original input text (un-normalized) may be represented as a sequence $x=x_1, x_2, \ldots, x_n$ of tokens $x_i$. An exemplary input, referred to further below, is the sequence $x=Ay_1$ $woudent_2$ $of_3$ $see_4$ $'em_5$ (in which commas have been omitted for readability).

In embodiments of the present disclosure, a series of replacement generators are applied to the input sequence x. A replacement generator is a function that takes the sequence x as an input, and produces a collection of replacements. A replacement is generally of the form "replace tokens $x_i, \ldots, x_{j-1}$ with s." More precisely, a replacement is a triple $\langle i,j, s \rangle$, where $1 \le i \le j \le n+1$ and s is a sequence of tokens. In cases where i=j, the sequence s is inserted before $x_i$. In cases where s is empty, $x_i, \ldots, x_{j-1}$ are deleted. With reference to the above exemplary input sequence, the replacement $\langle 2,3,$ would not$\rangle$ replaces $x_2$=woudent with would not; $\langle 1,2,$ Ay$\rangle$ replaces $x_1$ with itself (thus resulting in no change to input sequence x); $\langle 1,2, \epsilon \rangle$ (where $\epsilon$ is the empty sequence) deletes $x_1$; and $\langle 6,6, . \rangle$ inserts a period at the end of sequence x. Replacement generators may be provided that are generic (cross-domain) or domain-specific, allowing domain customization.

The use of replacement generators allows for great flexibility. Each generator may be viewed as a black box, allowing replacements that are created heuristically, statistically, or by external tools to be incorporated within the same framework as one another.

Figure 1:
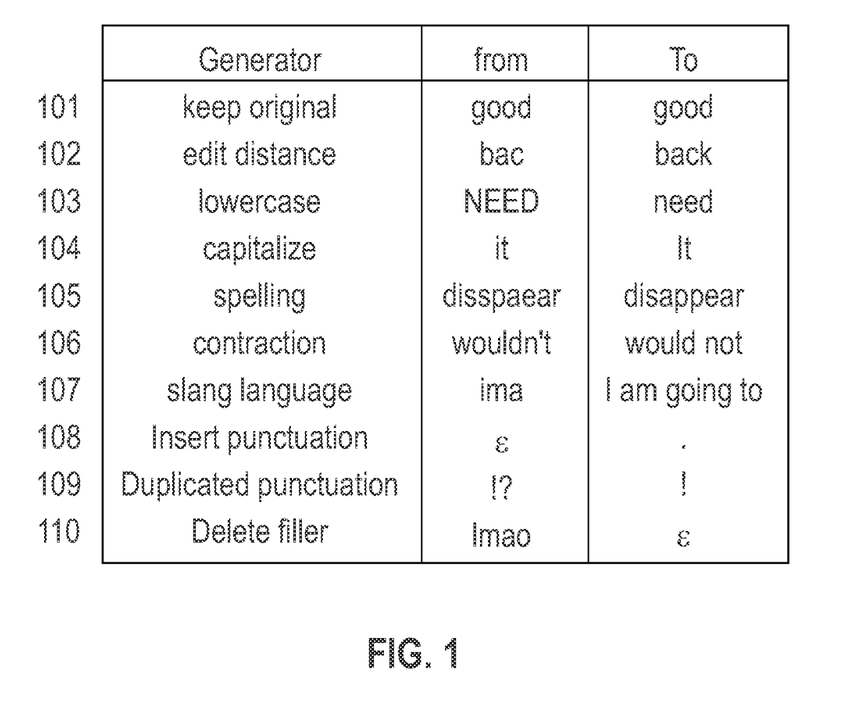
FIG. 1 depicts an exemplary set of replacement generators according to an embodiment of the present disclosure.

An exemplary set of generators is depicted in FIG. 1. Generator 101 (keep original) transforms an input to itself—resulting in no change. Generator 102 (edit distance) transforms an input into a dictionary word that has a minimal edit distance from the input. For example, mapping "bac" to "back" by inserting the missing "k". A variety of methods are known for calculating an edit distance, including Levenshtein distance, Hamming distance, Damerau-Levenshtein distance, and Jaro-Winkler distance. The edit distance generator may be backed by a variety of dictionaries corresponding to general language or domain specific language. Generator 103 (lowercase) transforms an input string into its lower case equivalent. Generator 104 (capitalize) capitalizes an input string. Generator 105 (spelling) performs a spell check on the input to determine the output. Various generators may use external spell checker services, or any spell checking algorithm known in the art. Generator 106 (contraction) expands a contraction into a complete phrase. For example, "wouldn't" is transformed into "would not". The contraction generator may be backed by a general dictionary of contractions, or a domain specific dictionary. Generator 107 (slang language) transforms a slang phrase into a standard phrase. The slang language generator may be backed by a general dictionary or a domain specific dictionary reflecting common usage in a particular medium or region. Generator 108 (insert punctuation) takes the empty sequence ($\epsilon$), and inserts a punctuation mark. Generator 109 (duplicated punctuation) takes multiple punctuation marks in sequence, and replaces them with a single punctuation mark. For example, "!?" may be replaced with "!". Generator 110 (delete filler) removes words, replacing them with the empty sequence ($\epsilon$). For example, the abbreviation "lmao" may not be considered to have any informational value in certain domains, and thus should be removed.

Taken together, generators 101-110 cover a variety of normalization behavior, from changing non-standard word forms to inserting and deleting tokens. These particular generators are presented as examples, and a variety of additional generators may be included in a given embodiment. As an example of a specialized generator, a Twitter-specific generator may focus on the Twitter-specific notions of hashtags (#), ats (@), and retweets (RT). Generators may be implemented that allow for either the initial symbol or the entire token to be deleted (e.g., @Hertz to Hertz, @Hertz to $\epsilon$). In various embodiments of the present disclosure, generators may be specialized to SMS, Twitter, Call-center transcripts, or other any other communications medium. A given domain-adapted embodiment of the framework may include a combination of generic and domain specific generators.

Domain transfer according to the present disclosure is possible with only a small amount of effort. A relatively modest set of additional replacement generators included in each data set allow each domain-specific embodiment to significantly outperform the generic approach.

The flexibility of the model allows for the generation of as many or as few candidates as desired. For instance, the framework may be applied with generators that proposed every word for every token. This avoids the potential problem that reliance on largely heuristically produced generators could result in poor coverage. Second, the reliance on a small number of generators allows the system to consider n-to-m transitions that may be too combinatorially expensive if all possible tokens were considered.

Figure 2:
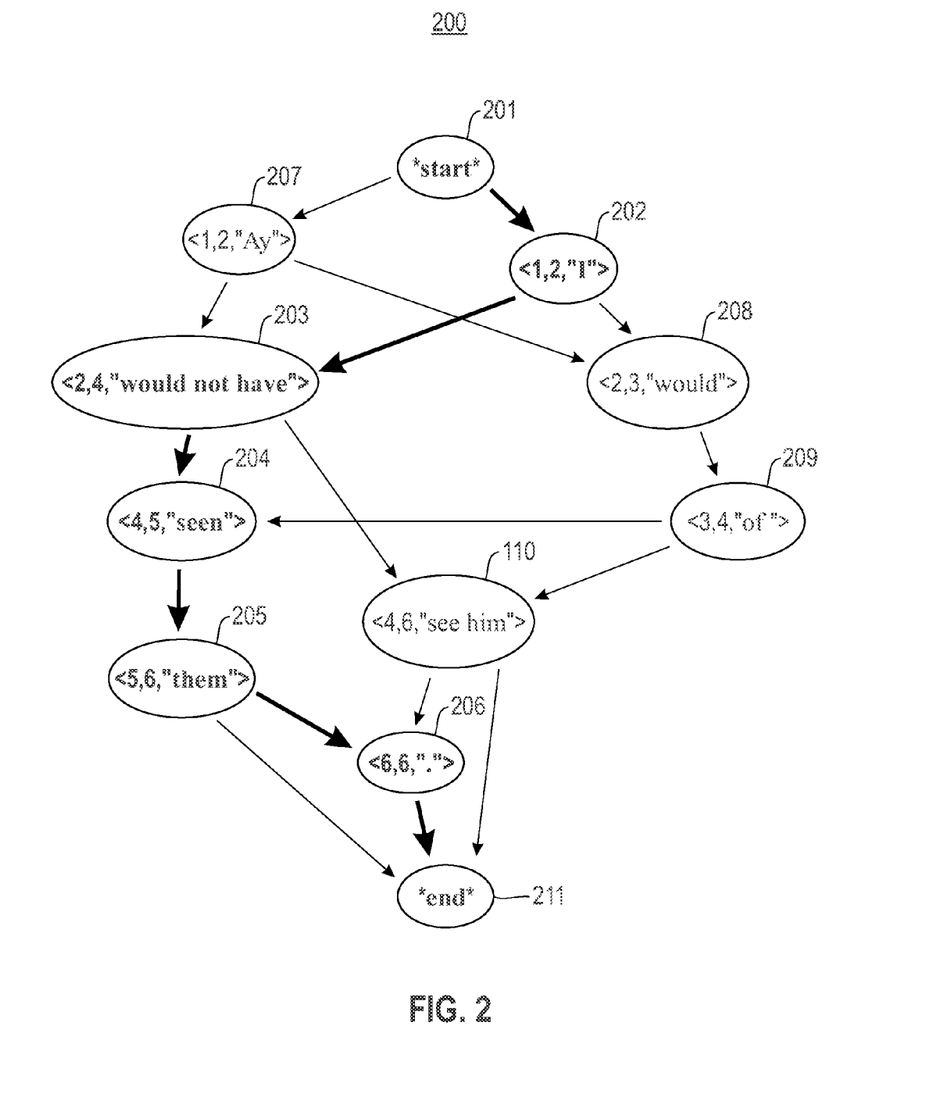
FIG. 2 depicts a normalization graph according to an embodiment of the present disclosure.

With reference to FIG. 2, a normalization graph according to an exemplary embodiment of the present disclosure is provided. Graph 200 comprises a plurality of nodes 201 ... 211. Each node lies along a path from start node 201 to end node 211. Each node has an associated replacement, depicted in the notation discussed above.

Given the input x and the set of replacements produced by the generators, a unique variable $X_r$ is associated with each replacement r. The variable $X_r$ is boolean. Where $X_r$ is true, the replacement r takes place in producing the output sequence. Dependencies among variables may be determined as follows. To determine syntactic consistency among truth assignments, let $r_1 = \langle i_1, j_1, s_1 \rangle$ and $r_2 = \langle i_2, j_2, s_2 \rangle$ be two replacements. Replacements $r_1$ and $r_2$ are considered locally consistent if the intervals $[i_1, j_1)$ and $[i_2, j_2)$ are disjoint. Locally consistent pairs of replacements can fire simultaneously (disregarding any other replacements). Two insertions are not allowed at the same position, therefore $[i_1, j_1)$ and $[i_2, j_2)$ are excluded from the definition of local consistency where $i_1 = j_1 = i_2 = j_2$. Where $r_1$ and $r_2$ are locally consistent and $j_1 = i_2$, $r_2$ is a consistent follower of $r_1$.

An assignment $\alpha$ to variables $X_r$ is sound if every two replacements $r_1$ and $r_2$ $\alpha(r_1) = \alpha(r_2) = $true are locally consistent. An assignment $\alpha$ is complete if every token of x is captured by at least one replacement r with $\alpha(r) = $true. Finally, $\alpha$ is legal if it is sound and complete. The output (normalized sequence) defined by a legal assignment is the concatenation of the strings s of the true replacement. For example, in FIG. 2, if bold nodes 202 ... 206 correspond to true values, the output would be I would not have seen them.

The graphs of FIG. 2 depicts two types of interdependencies among replacements. First, semantic dependencies capture the correlation among replacements. For example, replacing of with have, makes it more likely that the next see token be replaced with seen. In some embodiments, semantic dependencies are restricted to pairs that consist of a replacement and a consistent follower thereof. A syntactic dependency is due to the fact that an assignment is required to be legal.

As depicted in FIG. 2, dependencies may be modeled as a directed graph. Semantic dependencies are modeled by an edge from $X_r$ to $X_r'$ whenever r' is a consistent follower of r. In addition, start node 201 and end node 211 are included in graph 200, with an edge from start node 101 to each variable that corresponds to a prefix of x, and an edge from each variable that corresponds to a suffix of x to end node 211.

In other embodiments, dependencies may be modeled using other graphs, such as an undirected graph using Conditional Random Field. However, modeling the dependencies in a directed graph as discussed above provides that the legal assignments are in one-to-one correspondence with the paths from start to end.

The probability of an assignment is defined using the log-linear model formulation. The conditional probability of an assignment $\alpha$ given an input sequence x is defined in Equation 1, where $L(\alpha, x)$ is 1 if $\alpha$ is legal and 0 otherwise, $Z(x)$ is the partition function, $\phi_j(X, Y, x)$ is a real valued feature function that fires when both X and Y are true, and $\theta$ is the weight vector. The legal function $L(\alpha, x)$ ensures that only legal assignments have a positive probability.

$$p(\alpha | x) = \frac{1}{Z(x)} L(\alpha, x) \prod_{X \to Y} \exp\left(\sum_j \theta_j \phi_j(X, Y, x)\right) \quad \text{Equation 1}$$

According to embodiments of the present disclosure, in an inference step the output sequence with the highest probability is selected given the input sequence (i.e., maximum a posteriori probability (MAP) inference). In particular, the highest probability output sequence is given by an assignment $\alpha^* = \arg\max_\alpha p(\alpha|x)$. While exact inference is generally hard on general graph models, in the above model, inference is equivalent to finding the longest path in a weighted and acyclic directed graph.

The directed graph described above is acyclic (hence, a DAG). In particular, given any positive and/or negative weights on the edges, there exists a longest path (i.e., there are no positive cycles) between every pair of nodes. A real value $\Sigma_j \theta_j \phi_j(X, Y, x)$ may then be put as the weight for the edge X→Y. As noted above, a legal assignment α corresponds to a path from start to end. It may be shown that the summed weights of any path from start to end is equal to log p(α|x)+log Z(x). In particular, a longer path corresponds to an assignment with greater probability. Therefore, the MAP inference may be solved for the above model by finding the weighted longest path in the directed acyclic graph, which is a tractable problem.

In some embodiments of the present disclosure, edge weights are determined through a machine learning algorithm. In general, the items in a training set are pairs $(x_i, \alpha_i^{gold})$ for i=1, . . . , n where $\alpha_i^{gold}$ is a gold-standard assignment with respect to $x_i$. In some embodiments, $\alpha_i^{gold}$ is computed from a manually normalized sequence using a dynamic programming algorithm. Learning may be done via maximum likelihood estimation per Equation 2. The result of the partial derivative is given in Equation 3, where $\Phi_j(\alpha, x) = \Sigma_{X \to Y} \phi_j(X, Y, x)$, i.e., the sum of feature j along the path of α. The expected value of the sum of feature j, with respect to the probability of assignment with the current weight vector is given by $E_{p(\alpha_i | x_i, \theta)} \Phi_j(\alpha_i, x_i)$.

$$L(\theta) = \log \prod_i p(\alpha_i = \alpha_i^{gold} | x_i, \theta) \quad \text{Equation 2}$$

$$\sum_i \left( \Phi_j(\alpha_i^{gold}, x_i) - E_{p(\alpha_i | x_i, \theta)} \Phi_j(\alpha_i, x_i) \right) \quad \text{Equation 3}$$

Due to the inclusion of n-to-m transitions and the syntactic dependencies, naïve computation of $E_{p(\alpha_i|x_i,\theta)} \Phi_j(\alpha_i, x_i)$ requires enumerating all legal assignments. A less computationally intensive perceptron-style algorithm may be used instead. In such an approach, instead of computing the expectation, $\Phi_j(\alpha_i^*, x_i)$ is computed, where $\alpha_i^*$ is the most probable assignment generated using the current weight vector. The resulting approximated derivative is given in Equation 4.

$$\sum_i \left( \Phi_j(\alpha_i^{gold}, x_i) - \Phi_j(\alpha_i^*, x_i) \right) \quad \text{Equation 4}$$

According to some embodiments of the present disclosure, the perceptron-style learning applies the following two steps iteratively: (1) Generate the most probable sequence within the current weights; and (2) Update the weights by comparing the path generated in the previous step to the gold standard path.

In another aspect of the present disclosure, systems and methods are provided for evaluating the performance of a normalizer based on how it effects the performance of downstream applications. As observed above, evaluation metrics based on word-to-word mapping may not be suitable to evaluate downstream performance. First, different words are unlikely to have equal weights, contrary to the assumption inherent in word-to-word mapping. Second, word-to-word metrics do not take into account potentially important non-word information such as punctuation or capitalization.

In addition, word-to-word metrics do not take into account other aspects that may affect downstream performance, such as word reordering.

An evaluation metric that directly equates normalization performance with the performance of a common downstream application—dependency parsing is provided. First, gold standard normalized data is created by manually normalizing sentences to their full grammatically correct form. In addition to the word-to-word mapping performed in typical normalization gold standard generation, this annotation procedure includes all actions necessary to make the sentence grammatical, such as word reordering, modifying capitalization, and removing emoticons. A dependency parser is then run on the gold standard normalized data to produce gold standard parses. Although the parser could still produce mistakes on the grammatical sentences, this provides a realistic benchmark for comparison, as it represents an upper bound on the possible performance of the parser, and avoids an expensive second round of manual annotation.

To compare the parses produced over automatically normalized data to the gold standard, an analysis is performed of the subjects, verbs, and objects (SVO) identified in each parse. The metric in Equations 5 and 6 is based on the identified subjects and objects in those parses. The set of identified subjects and objects are denoted SO whereas $SO^{gold}$ denotes the set of subjects and objects identified when parsing the gold standard normalization.

$$precision_{SO} = \frac{|SO \cap SO^{gold}|}{|SO|} \quad \text{Equation 5}$$

$$recall_{SO} = \frac{|SO \cap SO^{gold}|}{|SO|^{gold}} \quad \text{Equation 6}$$

Figure 3:
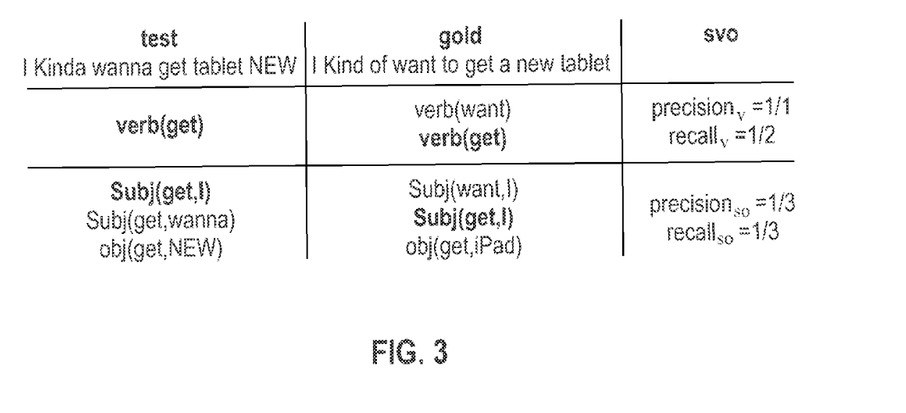
FIG. 3 depicts exemplary performance metrics according to an embodiment of the present disclosure.

Referring to FIG. 3, subjects, verbs and objects identified on example test/gold text are shown with their corresponding metric scores. The metrics for $precision_V$ and $recall_V$ where the set V of identified verbs is compared to $V^{gold}$ of those found in the gold-standard normalization, are defined as for the SO metrics above.

In an exemplary embodiment of the disclosed framework, although real valued features are supported, all features are binary. The feature set pulls information from several different sources. Information from n-grams is used to compare the candidate normalization to the original tokens, and to compare candidate capitalizations. N-gram information may be produced from sources such as the Corpus of Contemporary English (COCA). In this embodiment, part-of-speech information is used to produce features that discourage certain behavior, such as the deletion of noun phrases. Part-of-speech information over the original raw text may ge generated using an external part-of-speech tagger. The part of speech information obtained this way may be noisy, but if this leads to unreliable features then the learning algorithm will weight them accordingly. Positional information is used primarily to handle capitalization and punctuation insertion, for example, by incorporating features for capitalized words after stop punctuation or the insertion of stop punctuation at the end of the sentence. Finally, this exemplary embodiment includes binary features that indicate which generator spawned the replacement.

Figure 4:
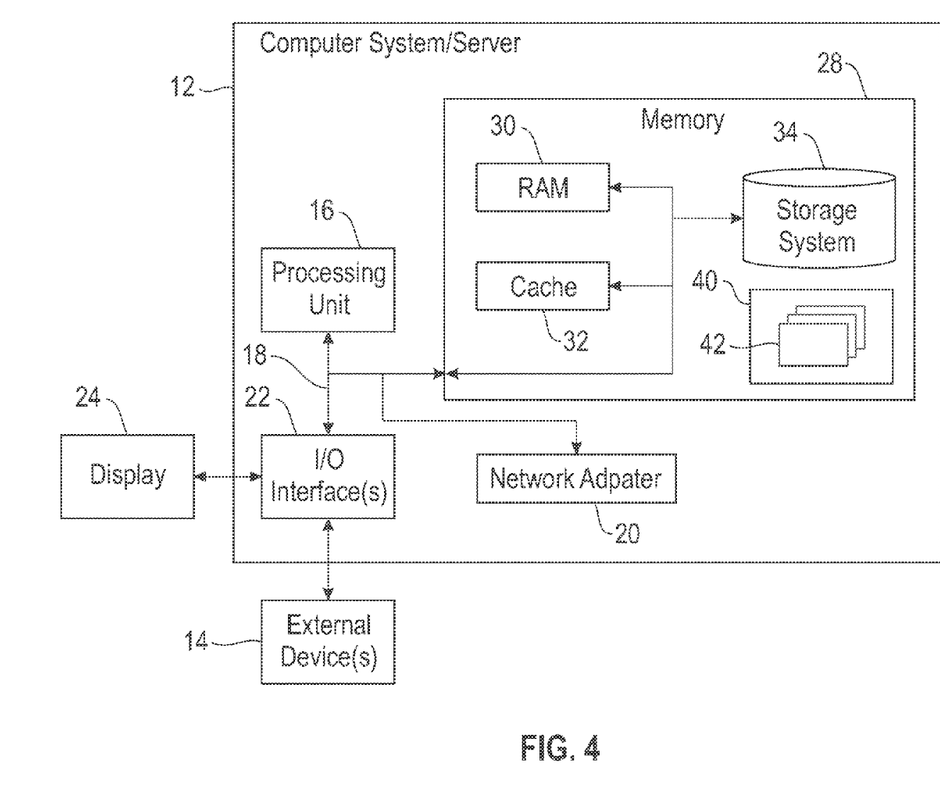
FIG. 4 depicts a computing node according to an embodiment of the present invention.

Referring now to FIG. 4, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving at a computing node an input sequence comprising a plurality of tokens;
   applying by a processor of the computing node a plurality of domain-specific generators to the input sequence to generate a set of candidate replacements of the tokens of the input sequence;
   creating in a memory of the computing node a directed graph comprising a plurality of nodes and a plurality of edges, each node having an associated candidate replacement of the set of candidate replacements, and each edge connecting a first node to a second node, the second node being associated with a consistent follower of the candidate replacement associated with the first node, and creating the plurality of edges comprising determining syntactic consistency between each pair of the set of candidate replacements;
   determining by the processor a plurality of paths in the directed graph, each of the plurality of paths comprising at least one of the plurality of edges;
   determining by the processor a score for each of the paths;
   selecting by the processor a path of the plurality of paths having the highest score;
   applying by the processor each candidate replacement of the selected path to the input sequence to generate a normalized output sequence; and
   evaluating a correctness of the normalized output sequence by parsing the normalized output sequence to obtain a parse result and comparing the parse result with a gold standard that is obtained by parsing a manually normalized sequence.

2. The method of claim 1, wherein the graph is directed and acyclic.

3. The method of claim 1, wherein determining the score for each of the paths comprises aggregating a plurality of edge weights along each path.

4. The method of claim 3, further comprising:
determining edge weights from a training data set, the training data set comprising a plurality of training input sequences, each training input sequence associated with a normalized sequence.

5. The method of claim 4, wherein determining edge weights comprises performing maximum likelihood estimation.

6. The method of claim 4, wherein determining edge weights comprises iteratively generating a sequence with a highest score based on the edge weights and updating the edge weights by comparing the sequence with the highest score to the normalized sequence.

7. The method of claim 1, further comprising:
comparing the normalized output sequence to a training sequence to determine a number of subjects, verbs, and objects overlapping between the training sequence and the normalized output sequence.

8. The method of claim 1, wherein one of the plurality of generators determines a candidate replacement by determining a minimum edit distance from one of the plurality of input tokens.

9. The method of claim 1, wherein one of the plurality of generators determines a candidate replacement by changing a case of one of the plurality of input tokens.

10. The method of claim 1, wherein one of the plurality of generators determines a candidate replacement by correcting the spelling of one of the plurality of input tokens.

11. The method of claim 1, wherein one of the plurality of generators determines a candidate replacement by expanding a contraction of one of the plurality of input tokens.

12. The method of claim 1, wherein one of the plurality of generators determines a candidate replacement by looking up one of the plurality of input tokens in a dictionary.

13. The method of claim 1, wherein the score comprises a probability.

14. A computer program product for text normalization, the computer program product comprising a computer readable storage medium having program code embodied therewith, the program code executable by a processor to:
receive at a computing node an input sequence comprising a plurality of tokens;
apply by a processor of the computing node a plurality of generators to the input sequence to generate a set of candidate replacements of the tokens of the input sequence;
create in a memory of the computing node a directed graph comprising a plurality of nodes and a plurality of edges, each node having an associated candidate replacement of the set of candidate replacements, and each edge connecting a first node to a second node, the second node being associated with a consistent follower of the candidate replacement associated with the first node, and creating the plurality of edges comprising determining syntactic consistency between each pair of the set of candidate replacements;
determine by the processor a plurality of paths in the directed graph, each of the plurality of paths comprising at least one of the plurality of edges;
determine by the processor a score for each of the paths;
select by the processor a path of the plurality of paths having the highest score;
apply by the processor each candidate replacement of the selected path to the input sequence to generate a normalized output sequence; and
evaluate a correctness of the normalized output sequence by parsing the normalized output sequence to obtain a parse result and comparing the parse result with a gold standard that is obtained by parsing a manually normalized sequence.

15. The computer program product of claim 14, wherein the graph is directed and acyclic.

16. The computer program product of claim 14, wherein determining the score for each of the paths comprises aggregating a plurality of edge weights along each path.

17. The computer program product of claim 16, the program code being further executable to:
determining edge weights from a training data set, the training data set comprising a plurality of training input sequences, each training input sequence associated with a normalized sequence.

18. The computer program product of claim 17, wherein determining edge weights comprises performing maximum likelihood estimation.

19. The computer program product of claim 17, wherein determining edge weights comprises iteratively generating a sequence with a highest score based on the edge weights and updating the edge weights by comparing the sequence with the highest score to the normalized sequence.

20. The computer program product of claim 17, the program code being further executable to:
comparing the normalized output sequence to a training sequence to determine a number of subjects, verbs, and objects overlapping between the training sequence and the normalized output sequence.

* * * * *